Figure 1:
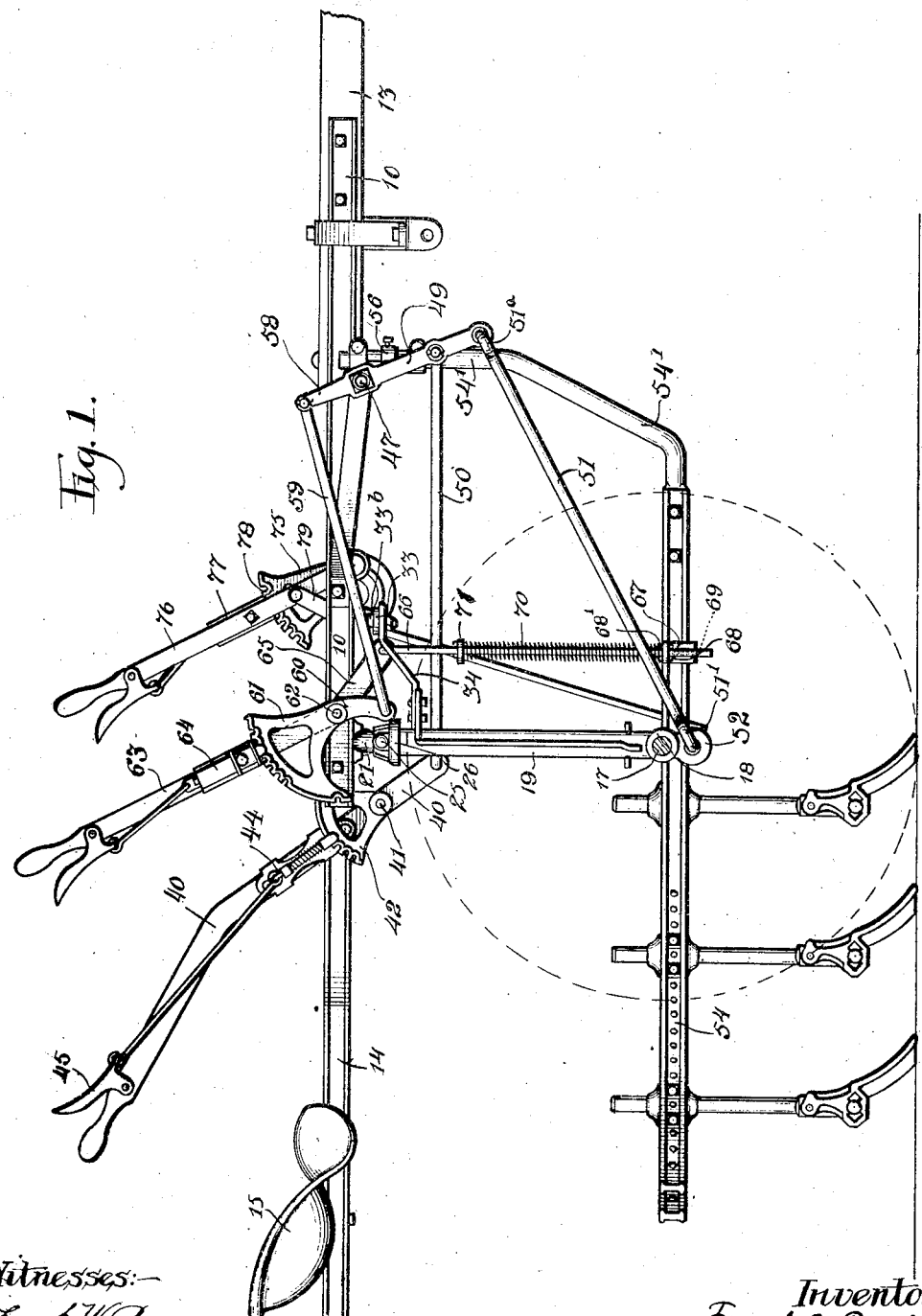

F. E. DAVIS.
CULTIVATOR.
APPLICATION FILED OCT. 17, 1908.

1,138,635.

Patented May 11, 1915.
4 SHEETS—SHEET 4.

Witnesses:—
Frank W. Bemm
Leone S. Russell

Inventor:—
Frank E. Davis
By F. A. Gerlach
his Atty.

UNITED STATES PATENT OFFICE.

FRANK E. DAVIS, OF LA CROSSE, WISCONSIN.

CULTIVATOR.

1,138,635. Specification of Letters Patent. Patented May 11, 1915.

Application filed October 17, 1908. Serial No. 458,163.

*To all whom it may concern:*

Be it known that I, FRANK E. DAVIS, a resident of La Crosse, in the county of La Crosse and State of Wisconsin, have invented certain new and useful Improvements in Cultivators, of which the following is a full, clear, and exact description.

The invention relates to cultivators and more particularly to the mechanism for manipulating the shovel gangs for steering the machine and balancing the machine in operation.

In riding-cultivators it has heretofore been common to adjust the carrying-wheels relatively to the frame, to balance the frame and so as to avoid undue pressure on the necks of the draft-animals. It has also been common to dirigibly connect the wheels to the frame. It has also been common to conjointly adjust the carrying-wheels relatively to the frame and raise or lower the shovel-beams in a cultivator in which the wheels are not dirigibly connected to the frame.

One object of the present invention is to provide mechanism whereby dirigible carrying-wheels may be adjusted relatively to the frame to balance the latter in operation and which is connected to the shovel-beams so that the dirigible carrying-wheels and the shovel-beams may be conjointly adjusted to balance the frame on the dirigible carrying-wheels when the shovels are operating at different depths, and when the shovel-beams are raised or lowered; this result being attained by providing a lever and connections between the hand-lever and the dirigible-wheels whereby the carrying-wheels will be adjusted relatively to the frame to balance the latter and to manipulate the shovel-beams from one of their alternative positions to the other and which connections permit the wheels to be turned to steer the machine without disturbing the assigned relation of the balancing and raising or lowering-connections.

Another object of the invention is to provide improved mechanism for conjointly adjusting the carrying-wheels to balance the frame and for raising or lowering the shovels and whereby the shovel-beams and shovels may be forcibly held in the soil at different depths as may be desired according to the condition or nature of the soil or the depth at which the soil is to be cultivated. In cultivators as heretofore constructed in which the adjustment of the carrying-wheels to balance the machine and the raising and lowering of the shovel-beams were conjointly effected, the beams were necessarily suspended by flexible connections from the frame and it was necessary for the operator to use his feet to force or hold the shovels into the ground, at least, in certain soils. As a result of this feature of the present invention, the operation of a single lever will conjointly adjust the carrying-wheels relatively to the frame and the shovel-beams will be raised or lowered and when lowered, pressure will be exerted thereupon by the hand-lever connection, so that the shovels will be forcibly held in the soil as desired without further attention of the operator, thus leaving the operator's feet free to steer the machine.

A still further object of the invention is to provide an improved dirigible wheel-mount which is simple in construction.

The invention further designs to provide a cultivator of improved construction.

The invention consists in the several novel features hereinafter set forth and more particularly defined by claims at the conclusion hereof.

Figure 2:
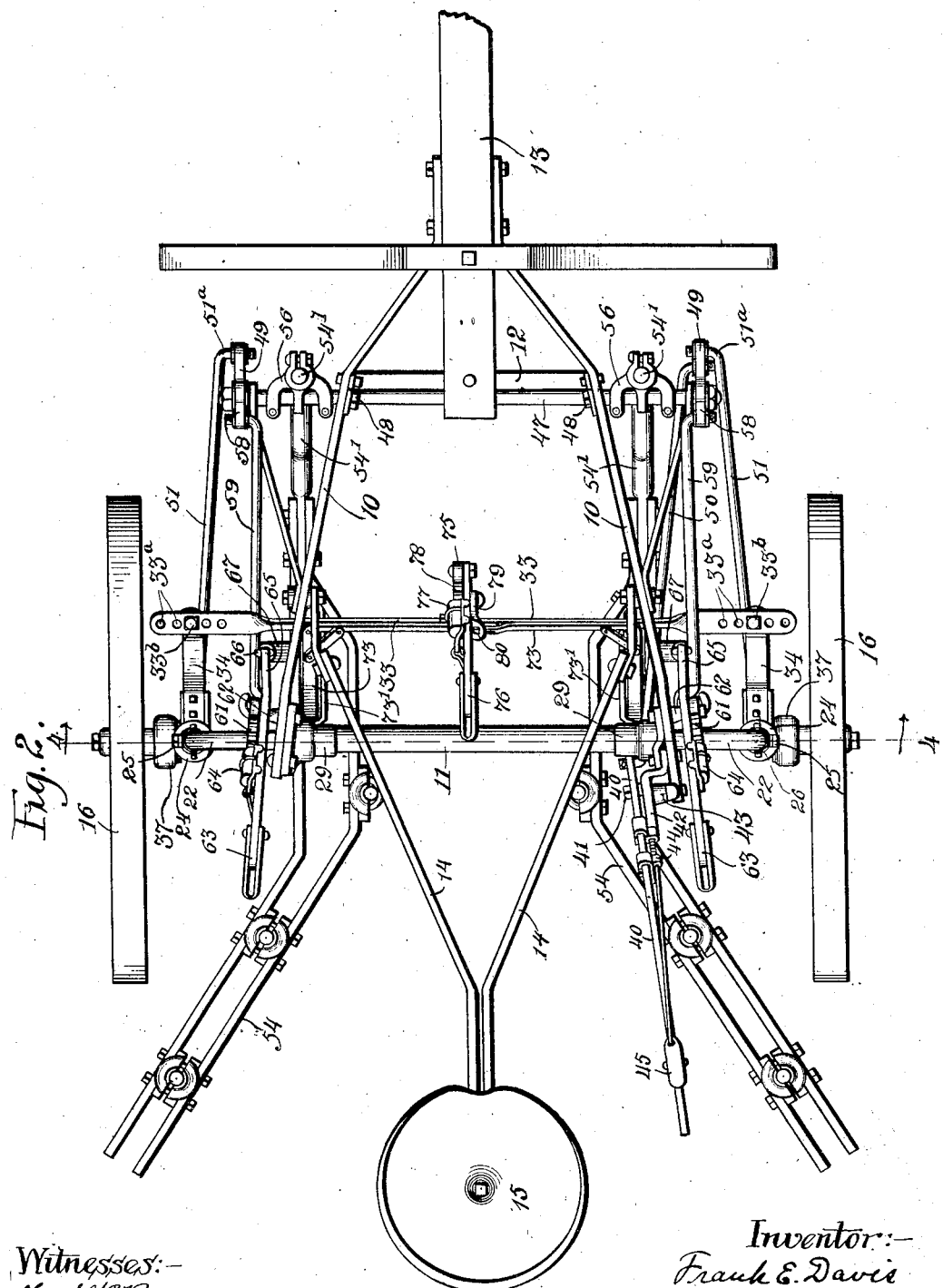
Figure 3:
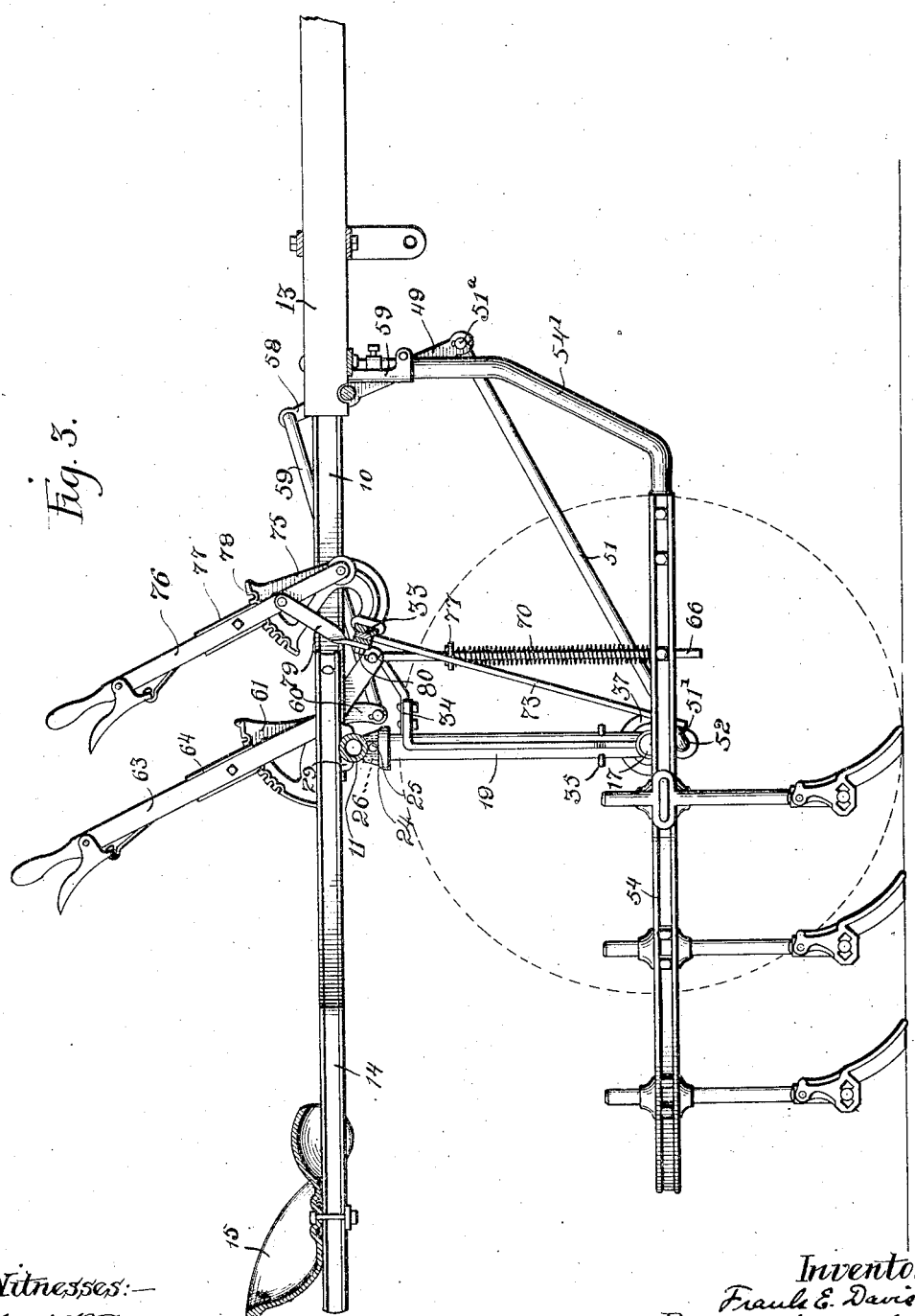
Figure 4:
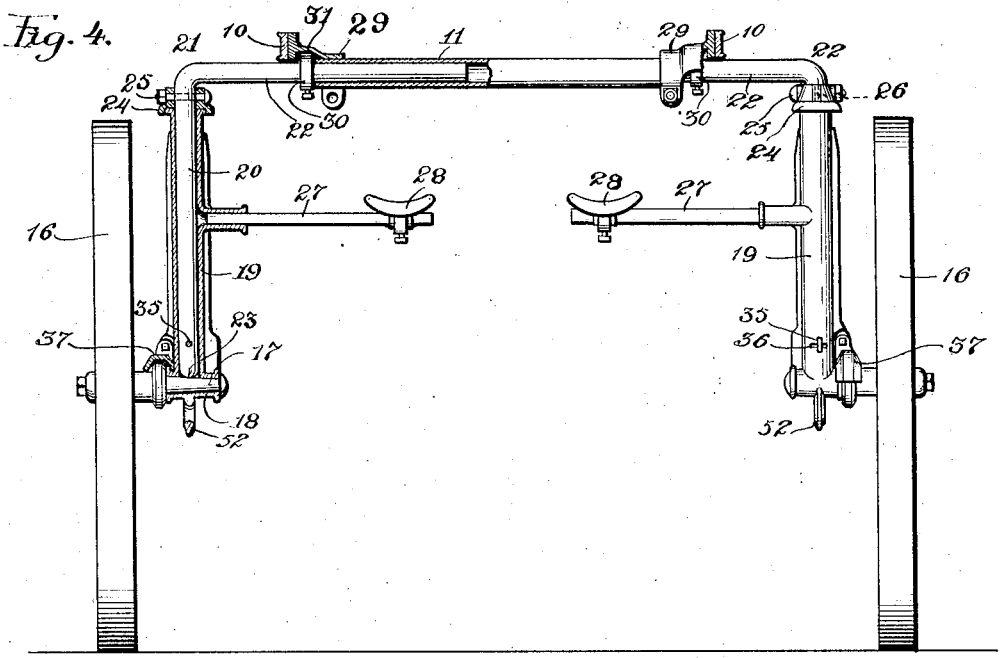
Figure 5:
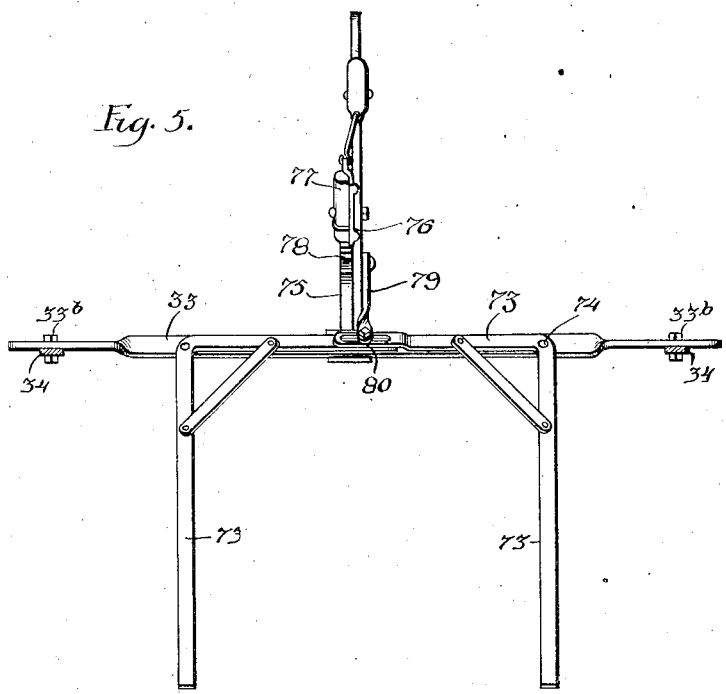

In the drawings: Figure 1 is a side elevation of a cultivator embodying the invention, one of the carrying-wheels being removed. Fig. 2 is a plan. Fig. 3 is a central longitudinal section. Fig. 4 is a transverse section taken on line 4—4 of Fig. 2, parts being shown in elevation.

The frame of the cultivator comprises side-bars 10, a cross-pipe 11 connecting the side-bars at the rear, and a front cross-bar 12. A tongue 13 is secured to the front ends of side-bars 10 and front cross-bar 12. A seat-support 14 at the rear end of which is secured an operator-seat 15, is suitably connected as at 16 to the side-bars of the frame. The frame is sustained by a pair of carrying-wheels 16 one at each side of the frame. An arch-axle comprising a section 21 for each wheel 16 connects the carrying-wheels to the frame. The connection between each carrying-wheel and the frame is dirigible so that the wheels may be swung horizontally to determine the course of travel of the machine. For this purpose the hub of each carrying-wheel is journaled on a laterally projecting stud 17 rigidly secured in a socket 18 which is formed at the lower end of a vertical sleeve 19 which is rotatably connected to the vertical arm 20 of arch-axle section 21 which has a horizontal arm 22 extending into and journaled in the pipe-beam 11 of the frame. The lower end of the vertical arm 20 of the arch-axle section is provided with a convex or pointed terminal 23 which rests on the wheel-stud or member 17 to form a pivotal bearing for the dirigible arch-axle section and about which the carrying-wheel may be swung laterally. The sleeve 19 provides an extended vertical bearing around the vertical arm 20 of the upper member of the arch-axle section and a flanged dust-collar 24 secured to the arch-axle by a bolt 25 protects the upper end of the sleeve and is provided with an oil-hole 26 whereby the dirigible connection between the arch-axle and the carrying-wheel may be lubricated. In practice it is customary to form the upper member of the arch-axle and the lower member or stud 17, of steel and by extending its lower end into engagement with the wheel-stud, a durable and sensitive dirigible connection is provided for each carrying-wheel. The vertical arm 20 of each upper arch-axle member has extended therethrough a pin 35 disposed in a slot 36 in the sleeve wherein it is held, to limit the swing of the carrying-wheels, and to hold the sleeve and vertical arm in connected relation. A dust-guard 37 is bolted to each sleeve 19 to protect the hub of the carrying-wheel. An inwardly-extending arm 27 is secured to each sleeve and has secured thereto a pedal 28 in convenient position for the operator's feet so that the angular disposition of the wheels may be readily controlled by the operator. At each end, pipe-beam 11 is connected to one of the side-bars 10 of the supporting-frame by a bracket 29 which is bolted to the side-bar and formed to receive the terminal of the pipe-beam. An adjustable collar 30 on the horizontal arm of each upper member of each arch-axle section is held against longitudinal movement in groove 31 in the bracket 29 to secure the arch-axle section against longitudinal movement in the pipe-beam 11 while permitting it to oscillate therein for the purpose of relatively adjusting the carrying-wheel with respect to the frame to balance the latter on the wheels. By pivotally connecting each arch-axle section to the cultivator frame in this manner the wheels are rendered longitudinally adjustable with respect to the frame to balance the frame. The arch-axle sections may also be adjustable laterally so that the carrying-wheels may be set to travel different distances apart and between rows or in furrows differently spaced. Lateral adjustment of the wheels may be effected by loosening the collars 30 and shifting the horizontal arms 22 inwardly or outwardly. The carrying-wheels are cross-connected to be conjointly swung, by a connecting-bar 33 secured respectively to the ends of arm 34 one of which is secured to each of the axle-sleeves 19. This bar is provided with a number of perforations 33$^a$ either of which is adapted to receive a pivot-bolt 33$^b$ so that as the arch-axles are adjusted inwardly or outwardly, connections between arms 34 and the cross-bar may be correspondingly adjusted to maintain the carrying-wheels in parallel relation. Resultantly, when either of the treadles 29 is operated both of the carrying-wheels will respond thereto to determine the course of travel of the cultivator.

Means for adjusting the arch-axle-sections to balance the frame thereon comprises a hand-lever 40 which is pivotally sustained as at 41 in a rack 42 which is rigidly secured as at 43 to one of the side-bars 10 of the supporting-frame. Lever 40 is provided with a lock 44 controlled by a finger-lever 45 whereby the lever may be locked in different positions to the rack 42. This hand-lever 40 is connected to conjointly adjust both of the carrying-wheels longitudinally to balance the frame. A cross-shaft 47 is journaled in brackets 48 secured to the side-bars 10 of the frame and has rigidly secured to each end, an arm or lever 49. Hand-lever 40 is connected to rock shaft 47 by a rod or link 50 which is pivotally connected to the lower end of the hand-lever and to one of the levers 49. Each lever 49 is connected by a rod 51 to an eye 52 formed on the lower end of the arch-axle sleeves 19, respectively, said links being pivotally connected to said eyes by an eye 51' and to the lower end of arm 49 by an eye 51$^a$. These eye-connections between rod 51 and the lower arch-axle members are disposed to form pivotal connections between said rods and the arch-axle sleeves, which are concentric or in line with the vertical axis of the sleeve about which they swing horizontally. Resultantly, when the carrying-wheels and sleeves are shifted to vary the direction of travel of the machine the balancing-connections will not interfere with the steering of the machine. Furthermore, a connection is provided which leaves the carrying-wheels free to be steered while the balancing-connection for the frame may be locked in different positions. The invention thus provides a balancing-connection for the wheels which is capable of use with dirigible carrying-wheels and which leaves the carrying-wheels free to be swung laterally without influencing them to move to either one side or the other.

Shovel-beams or drag-bars 54 are each pivotally connected at their front and upper ends to the cross-shaft 47 by a swivel-coupling 56 of usual construction, so that the drag-bars are free to swing vertically to raise or lower the shovels carried thereby and to swing laterally. Each swivel-coupling 56 is pivotally mounted on the cross-rod 47 to permit the beam to be be raised or lowered, and each standard 54' at the front end of each shovel-beam is pivotally mounted in the coupling 56 to permit the shovel-beams to be swung laterally as desired. Mechanism is provided for raising or lowering the shovel-beams and this mechanism is operatively connected to the hand-lever 40 so that said lever will conjointly adjust the carrying-wheels to balance the frame and accordingly raise or lower the shovel-beams so that the frame will be maintained at all times in balanced relation on the wheels and in accordance with the position of the shovel-beams. In practice it has been found that the deeper the shovels are operating in the soil, the greater the tendency of the tongue to strain the horses' necks and therefore it is desirable to shift the carrying-wheels, with respect to the frame, in degree corresponding to the depth of the shovels in the soil. In order to maintain the desired relative adjustment of the balancing-means and the raising and lowering-connections according to different characters of soil and to permit each of the raising and lowering connections to be adjusted independently of one another when desired, an adjustable hand-lever 63 is interposed in each raising and lowering connection between the cross-shaft 47 and the shovel-beams. Each lever 49 on the cross-shaft 47 is provided with an upwardly extending arm 58 which is connected by a rod or link 59 to an arm 60 on a rack 61 which is pivotally connected as at 62 to the supporting-frame. Hand-lever 63 is pivoted concentrically with the rack 61 and is provided with a finger-lever controlled lock 64 adapted to engage the notches in said rack and to lock the lever and the connection controlled thereby. Each hand-lever 63 is extended below its pivot as at 65 and is connected to one of the shovel-beams by a rod 66 having its upper end pivoted to said lever-arm 65 and its lower end slidably held in a bracket 67 secured to the shovel-beam. A pin 68, is adapted to extend through either of a series of holes 69 in the lower end of rod 66 and to engage bracket 67 on the shovel-beam to cause the shovel-beam to be positively lifted by rod 66 when the lifting-connection is operated.

In some soils it is necessary or desirable, in order to insure the travel of the shovels at the proper depth, to forcibly hold the shovels therein and for this purpose a yieldable pressure-device comprising a spring 70 is applied to force the shovel-beam downwardly to hold the shovels thereon in the soil at the desired depth. This spring is interposed between an adjustable collar 71 on rod 66 and the bracket 67 on the shovel-beam. Resultantly, whenever independent adjustment of, or variation of pressure upon one of the beams is desired, hand-lever 63 may be unlocked from rack 61, which is operated by the hand-lever 40, which conjointly operates both of the shovel-beams and the carrying-wheels to balance the frame. By this adjustment of hand-lever 63 the beams may be adjusted independently of the conjoint lifting and balancing-mechanism and the pressure upon the shovel-beams may be varied to cause the shovels thereon to be yieldingly held in the ground at the desired depth. If it is desired to non-yieldingly hold the shovels in the soil, the rod 66 may be connected to operate the shovel-beams positively in both directions by extending a pin 68' through the rod above a bracket 67, as shown in Fig. 1. The invention thus provides a cultivator in which shovel-beams are conjointly raised and lowered or in which the frame is balanced and the beams are raised or lowered conjointly therewith and in which the shovels may be forcibly held in the soil at different depths, and as the shovels are forced into the ground the balancing-connections will be operated to overcome additional pull on the necks of the draft-animals.

At times it is desirable to employ a sway-bar for causing both of the shovel-beams to move together laterally, and for this purpose a pair of angular levers 73 are pivotally connected as at 74 to the cross-bar 33 which connects the carrying-wheels. A bracket 75 is secured to cross-bar 33 and a hand-lever 76 is pivoted in said bracket. A lock 77 is provided for engaging the teeth of a rack 78 on bracket 75 and said lever is connected to the angular levers 73 by a link 79 which is pivoted to the hand-lever and to both of the angular levers by a stud-and-slot connection 80. The lower end of each lever 73 extends into a slot 73' on one of the beams so that the beams will be free to rise and fall independently of the lever, but will be controlled laterally by the lever. By adjustment of lever 76 about its pivot, levers 73 will be swung about their respective pivots to cause the shovel-beams to be held the desired distance apart and lock 77 and rack 78 serve to hold hand-lever 76 and levers 73 in assigned relation.

The operation of the improved cultivator will be as follows: The operator in the seat 15 may at all times control the course and direction of travel of the carrying-wheels by shifting one of the treadles 28 backwardly or forwardly according to the direction desired, each of the carrying-wheels being dirigibly connected to the frame by an arch-axle section and connected to the other wheel for conjoint swinging movement, by cross-bar 33. To raise or lower the shovel-beams, the operator will unlock hand-lever 40 and shift it, which will cause rod 50 to shift cross-shaft 47. Such shift of said shaft will cause both of the arms 49 to operate rods 51 and swing the arch-axle sections and their sleeves 19 forwardly or backwardly to balance the frame on the carrying-wheels. Such shift of said shaft 47 will also effect raising or lowering of the shovel-beams by means of rods 59, racks 61, levers 65, rods 66 and the pressure-springs 70. Resultantly, the hand-lever 40 conjointly operates the frame balancing-means and the means for raising or lowering the shovel-beams. When it is desired to raise one of the shovel-beams independently of the other, it may be done by releasing lock 64 from rack 61 so that the hand-lever 63 will be free to operate the shovel-beam to which it is connected, independently of the balancing-means and the other shovel-beam. If it is desired to vary the pressure applied to either of the beams by its pressure-device, such variation may be effected by adjustment of the hand-lever 63 on rack 61. So also the relative position of the carrying-wheels with respect to the frame and the relative position of the shovel-beam may be varied, so that under different conditions of the soil the frame will be properly balanced while the shovel-beams will be held so the shovels thereon will travel in the soil at the desired depth. This adjustment is particularly desirable when pressure-devices are employed for holding the shovels in the soil at different depths so that the relative position of the carrying-wheels with respect to the frame will be maintained to properly balance the frame to prevent the front end of the tongue from straining the horses' necks, as variation of the pressure-devices will frequently render variation of the balancing-means necessary to maintain the desired balanced relation and prevent the tongue from straining the horses' necks.

The invention thus provides an improved structure in which the balancing-means for the frame and the shovel-beams are conjointly operated and which are capable of operation with pressure-devices for holding the shovels in the soil at different depths.

The invention further provides an improved structure in which the balancing-means and the raising and lowering-means for the beams are conjointly operated and in which the wheels are dirigibly connected to the frame so that they will be free at all times to be turned to determine the course of travel of the machine, while the different mechanisms are in different positions.

It will be observed that the hand-lever 40 for conjointly controlling the balancing-connections and the shovel-beams, is pivoted at the rear of the frame, while the cross-shaft 47 is disposed at the front of the frame and is connected to said lever by a rod 50. When these are thus disposed the lever is arranged in convenient position for operation by the operator and the throw of the lever is from substantially a vertical to a point near the horizontal. This arrangement renders the lever easy of operation in use.

The invention is not to be understood as restricted to the details illustrated and described since these may be modified within the scope of the appended claims without departing from the spirit and scope of the invention.

Having thus described the invention, what I claim as new and desire to secure by Letters Patent, is:

1. In a riding-cultivator, the combination of a frame, carrying-wheels each dirigibly connected to the frame, means for steering the wheels, shovel-beams, raising and lowering connections for the beams, said beams being pivoted to swing vertically independently of the wheels, balancing-connections between the dirigible wheels and the frame, and means for conjointly shifting the balancing-connection to balance the frame and the beam connections to raise or lower the beams.

2. In a riding-cultivator, the combination of a frame, carrying-wheels, each pivotally connected to the frame to swing laterally and longitudinally, means for steering the wheels, shovel-beams pivotally sustained by the frame independently of the wheels, and a lever connected to said wheels to shift them longitudinally and to said beams to raise or lower them.

3. In a riding-cultivator, the combination of a frame, carrying-wheels each dirigibly connected to the frame, means for steering the wheels, shovel-beams, a balancing-connection between the dirigible wheels and the frame, and means connected to the balancing-connection and to the beams to raise or lower them, said connecting-means comprising a hand-lever for each beam for securing the levers in different positions on the rack.

4. In a riding-cultivator, the combination of a frame, carrying-wheels, each pivotally connected to the frame to swing laterally and longitudinally, means for steering the wheels, shovel-beams, a lever, connections between said lever and said wheels for shifting them to balance the frame, and a connection between said lever and the beams for raising or lowering them, the connection for shifting the wheels to balance the frame comprising a connection with the wheel which is concentric with the pivot about which the wheel swings laterally, the connection between the lever and the shovel-beams comprising a lever for adjusting the shovel-beams independently of the connection.

5. In a riding cultivator, the combination of a frame, an arch axle pivoted to the frame to swing longitudinally and comprising spindles, carrying-wheels mounted on said spindles, pivotal connections between the axle and the spindle which permit the wheels to swing laterally, and means for operating the arch axle sections to balance the frame, comprising rods pivotally connected to the arch-axle below the spindles and substantially concentric with the axes about which the spindles swing laterally.

6. In a riding cultivator, the combination of a frame, an arch-axle pivoted to the frame to swing longitudinally, comprising spindles, carrying-wheels mounted on said spindles, pivotal connections between the axle and the spindles which permit the wheels to swing laterally, and means for conjointly shifting the arch-axle to balance the frame and to raise or lower the beams said means comprising rods connected to the arch-axle sections at a point below the spindles and substantially alined with the axes about which the spindles swing laterally.

7. In a dirigible cultivator, the combination of a frame, carrying wheels therefor, an arch-axle comprising a vertically extending member and a sleeve around said member, the vertically extending member being pivoted to the frame to swing longitudinally, a spindle in said sleeve for one of the wheels, said vertically extending member resting in pivotal contact on the spindle, means for swinging the sleeve horizontally around the vertically extending member and a device between the sleeve and the vertically extending member for holding them together.

8. In a dirigible cultivator, the combination of a frame, carrying-wheels therefor, an arch-axle comprising upper and lower members, said upper member being pivoted to the frame to balance the frame and comprising a vertically disposed arm, and a lower horizontal member forming a spindle for the wheel, said upper member resting in pivotal contact on the lower member, connecting-means between said members, and means for swinging the lower member horizontally about the pivotal connection between the members.

9. In a dirigible cultivator, the combination of a frame, carrying-wheels therefor, an arch-axle comprising upper and lower members, said upper member being pivoted to the frame to balance the frame and comprising a vertically disposed arm, the lower horizontal member forming a spindle for the wheel, said upper member resting in pivotal contact on the lower member, a sleeve secured to one of said members and in which the other is pivotally held, and means for swinging the lower member horizontally about the pivotal connection between the members.

10. In a dirigible cultivator, the combination of a frame, carrying-wheels therefor, an arch-axle pivotally connected to the frame to swing longitudinally to balance the frame and comprising a vertically extending member and a lower member pivotally connected to the upper member and on which one of the wheels is mounted to swing horizontally, means for swinging the lower member horizontally to steer the wheel, and means for shifting the wheel longitudinally comprising a link pivotally connected to the axle at a point below the lower member and substantially concentric with the point about which the wheel swings horizontally.

11. In a dirigible cultivator, the combination of a frame, carrying-wheels therefor, an arch-axle pivotally connected to the frame to swing longitudinally to balance the frame and comprising a vertically extending member and a lower member pivotally connected to the upper member and on which one of the wheels is mounted to swing horizontally, means for swinging the lower member horizontally to steer the wheel, means for shifting the wheel longitudinally comprising a link pivotally connected to the axle at a point below the lower member and substantially concentric with the point about which the wheel swings horizontally, and an arm to which the front end of the link is connected.

12. In a dirigible cultivator, the combination of a frame, carrying-wheels therefor, an arch-axle pivotally connected to the frame to swing longitudinally to balance the frame and comprising a vertically extending member and a lower member pivotally connected to the upper member and on which one of the wheels is mounted to swing horizontally, means for swinging the lower member horizontally to steer the wheel, and means for shifting the wheel longitudinally comprising a link pivotally connected to the axle beneath the lower laterally swinging member at a point substantially concentric with the point about which the wheel swings horizontally.

13. In a dirigible cultivator, the combination of a frame, carrying-wheels therefor, an arch-axle pivotally connected to the frame to swing longitudinally to balance the frame and comprising a vertically extending member and a lower member pivotally connected to the upper member and on which one of the wheels is mounted to swing horizontally, means for swinging the lower member horizontally to steer the wheel, means for shifting the wheel longitudinally comprising a link pivotally connected to the axle at a point substantially concentric with the point about which the wheel swings horizontally, and a pivotal eye-connection between the link and the lower axle-member and beneath the lower member.

FRANK E. DAVIS.

Witnesses:
C. W. DICKINSON,
W. P. ROELLIG.